US008159838B2

(12) United States Patent
Chen et al.

(10) Patent No.: US 8,159,838 B2
(45) Date of Patent: Apr. 17, 2012

(54) FLYBACK CONVERTER SYSTEM CAPABLE OF PREVENTING TWO SIDE SWITCHES FROM BEING TURNED ON SIMULTANEOUSLY

(75) Inventors: Fu-Chuan Chen, Hsin-Chu (TW); Pao-Hung Tu, Hsin-Chu (TW)

(73) Assignee: Analog Integrations Corporation, Science Park, Hsin-Chu (TW)

( * ) Notice: Subject to any disclaimer, the term of this patent is extended or adjusted under 35 U.S.C. 154(b) by 219 days.

(21) Appl. No.: 12/713,160

(22) Filed: Feb. 25, 2010

(65) Prior Publication Data

US 2011/0110122 A1     May 12, 2011

(30) Foreign Application Priority Data

Nov. 10, 2009    (TW) .............................. 98138058 A

(51) Int. Cl.
 *H02M 3/335* (2006.01)
(52) U.S. Cl. ..................................................... 363/21.13
(58) Field of Classification Search ..................... 363/15, 363/16, 21.01, 21.12, 21.13
See application file for complete search history.

(56) References Cited

U.S. PATENT DOCUMENTS

| | | | | |
|---|---|---|---|---|
| 7,869,231 | B2* | 1/2011 | Cohen | 363/21.14 |
| 7,889,517 | B2* | 2/2011 | Artusi et al. | 363/16 |
| 8,059,429 | B2* | 11/2011 | Huynh | 363/18 |
| 2010/0027298 | A1* | 2/2010 | Cohen | 363/21.14 |

\* cited by examiner

*Primary Examiner* — Adolf Berhane
(74) *Attorney, Agent, or Firm* — Winston Hsu; Scott Margo

(57) ABSTRACT

A flyback converter system prevents a primary side switch and a secondary side switch from being turned on simultaneously through a controller. The controller includes a turning on switch module, a turning off switch module, and an enabling switch module. The turning on switch module is for turning on the secondary side switch. The turning off switch module switches off the secondary side switch according to the impedance of a load and the switch cycle of the secondary side switch. The enabling switch module enables the secondary side switch according to the impedance of the load.

32 Claims, 7 Drawing Sheets

FLYBACK CONVERTER SYSTEM CAPABLE OF PREVENTING TWO SIDE SWITCHES FROM BEING TURNED ON SIMULTANEOUSLY

BACKGROUND OF THE INVENTION

1. Field of the Invention

The present invention relates to a flyback converter system, and more particularly, to a flyback converter system capable of preventing two side switches from being turned on simultaneously.

2. Description of the Prior Art

Recently, because of rapid advances in electronic products, electronic products are shrinking in size and weight. Their functions are also increasingly diversified, but power consumption cannot rise simultaneously. Therefore, design of a power management integrated circuit (IC) becomes more complex, more efficient and demands a higher power density ratio per unit area. A high frequency switching power supply fits the above requirements well.

A flyback converter is one widely used switching power supply. Although the flyback converter may not require circuit isolation, the outputs and inputs of the flyback converter must be isolated in order to increase power efficiency, as well as for safety considerations. The flyback converter is a buck-boost converter with circuit isolation characteristics. A magnetic component of the flyback converter is used to transmit energy, and not as a transformer. In addition, the characteristics of the flyback converter are low cost, circuit design maturity, and simple structure. Therefore, the flyback converter is often used in design of an auxiliary power supply for supplying power to an entire system.

Please refer to FIG. 1. FIG. 1 is a diagram of a conventional flyback converter system 10. The flyback converter system 10 includes a power supply module 101 and a power receiving module 102. The power supply module 101 includes a voltage regulator 1011, a primary side 1012 of the flyback converter system 10, and a primary side switch 1013. The voltage regulator 1011 is used for stabilizing a voltage Vin. The primary side 1012 of the flyback converter system 10 is coupled to the voltage regulator 1011. The primary side switch 1013 is coupled between the voltage regulator 1011 and the primary side 1012 of the flyback converter system 10 for controlling a magnetic flux direction of the primary side 1012. The power receiving module 102 includes a secondary side 1021 of the flyback converter system 10, a secondary side switch 1022, a controller 1023, a load capacitor $C_L$, a load resistor $R_L$, a filtering capacitor Cdc, a resistor RMOT for adjusting turning-on time of the secondary side switch 1022, and a filtering resistor Rdc. The secondary side 1021 of the flyback converter system 10 is used for receiving power from the primary side 1012 of the flyback converter system 10; the secondary side switch 1022 is coupled to the secondary side 1021; and the controller 1023 determines whether the secondary side switch 1022 is turned on or off according to a drain voltage of the secondary side switch 1022.

When the primary side switch 1013 is turned on, electrical current passes through the primary side 1012 of the flyback converter system 10 gradually, and the flyback converter system 10 stores the power in the primary side 1012. Due to a variation of the magnetic flux of the primary side 1012, the primary side 1012 and the secondary side 1021 have opposite polarities. As shown in FIG. 1, both nodes A and B are at high voltages, so an inverse bias is imposed on a parasitic diode of the secondary side switch 1022, such that no power is transferred to the power receiving module 102. On the other hand, when the primary side switch 1013 is turned off, the magnetic flux of the primary side 1012 vanishes, resulting in a low voltage at the node B. Meanwhile, the parasitic diode of the secondary side switch 1022 is turned on, so there is power transferred to the power receiving module 102, current passes through the load resistor $R_L$, and the load capacitor $C_L$ is charged.

Please refer to FIG. 2. FIG. 2 is a waveform diagram of the drain voltage of the secondary side switch 1022, a gate voltage of the secondary side switch 1022, a turning-on lasting time, and a turning-off lasting time when the power receiving module 102 has a light load (discontinuous current mode, DCM). When the magnetic flux of the primary side 1012 vanishes, resulting in voltage at B point being lower than a switch turning-on threshold $V_{TH2}$, the secondary side switch 1022 is turned on and the gate voltage of the secondary side switch 1022 is converted from a low voltage to a high voltage. Because of the light load, current through the secondary side switch 1022 is low. When the magnetic flux direction changes again, the current through the secondary side switch 1022 reduces to zero. If the node B is at a voltage over a switch turning-off threshold $V_{TH1}$, the secondary side switch 1022 is turned off, and the gate voltage of the secondary side switch 1022 is converted from a high voltage to a low voltage.

Please refer to FIG. 3. FIG. 3 is a waveform diagram of a drain voltage of the secondary side switch 1022, a gate voltage of the secondary side switch 1022, the turned-on lasting time, and the turned-off lasting time when the power receiving module 102 has a heavy load (continuous current mode, CCM). When the magnetic flux of the primary side 1012 vanishes, resulting in voltage at the node B being lower than the switch turning-on threshold $V_{TH2}$, the secondary side switch 1022 is turned on, and the gate voltage of the secondary side switch 1022 is converted from a low voltage to a high voltage. Because of the heavy load, current through the secondary side switch 1022 is higher than the current in DCM mode. When magnetic flux direction changes again, the current through the secondary side switch 1022 is not reduced to zero. Because of a voltage drop between the drain and the source of the secondary side switch 1022, the switch turning-off threshold $V_{TH1}$ must be set lower than the switch turning-off threshold $V_{TH1}$ in DCM mode to avoid voltage of the node B being unable to rise over the switch turning-off threshold $V_{TH1}$, the secondary side switch 1022 being unable to be turned off, the primary side switch 1013 and the secondary side switch 1022 being turned on simultaneously, and the flyback converter system 10 being damaged.

To sum up, the conventional flyback converter system 10 has two disadvantages. First, when the flyback converter system 10 is designed to operate in DCM mode, the flyback converter system 10 may switch from DCM mode to CCM mode due to sudden introduction of a heavy load. Meanwhile a voltage of the node B cannot rise over the switch turning-off threshold $V_{TH1}$, so as to prevent the secondary side switch 1022 from being turned off, which would cause the primary side switch 1013 and the secondary side switch 1022 to be turned on simultaneously, and the flyback converter system 10 to be damaged. Second, setting the switch turning-off threshold $V_{TH1}$ for the heaviest load condition for safety reasons may prevent the flyback converter system 10 from being damaged, however the secondary side switch 1022 may also be turned off too fast in a light load condition, decreasing efficiency of the flyback converter system 10.

SUMMARY OF THE INVENTION

An embodiment of the present invention provides a flyback converter system capable of preventing two side switches from being turned on simultaneously. The flyback converter system comprises a power supply module, and a power receiving module. The power supply module comprises a voltage regulator, a primary side of the flyback converter system, and a primary side switch. The voltage regulator is used for stabilizing a voltage inputting the power supply module; the primary side of the flyback converter system is coupled to the voltage regulator; and the primary side switch is coupled between the voltage regulator and the primary side of the flyback converter system for controlling a magnetic flux direction of the primary side of the flyback converter system. The power receiving module comprises the secondary side of the flyback converter system, the secondary side switch, and the controller. The secondary side of the flyback converter system is used for receiving a power from the primary side of the flyback converter system; the secondary side switch is coupled to the secondary side of the flyback converter system; and the controller comprises a switch on module, a switch off module, and a flip-flop. The switch on module is used for turning on the secondary side switch; the switch off module is used for turning off the secondary side switch; the flip-flop is coupled to the switch on module and the OR gate for turning on or off the secondary side switch according to an output signal of the switch on module and an output signal of the switch off module. The switch turning-off module comprises a first switch off sub-module, a second switch off sub-module, and an OR gate. The first switch off sub-module is used for turning off the secondary side switch according to an impedance of a load coupled to the power receiving module; the second switch off sub-module is used for turning off the secondary side switch according to a period of the secondary side switch; and the OR gate is coupled to the first switch off sub-module and the second switch off sub-module for turning off the secondary side switch according to an output signal of the first switch off sub-module and an output signal of the second switch off sub-module.

Another embodiment of the present invention provides a controller capable of preventing two side switches of a flyback converter system from being turned on simultaneously. The controller comprises a switch on module, a switch off module, and a flip-flop. The switch on module is used for turning on a secondary side switch of the flyback converter system; the switch off module is used for turning off the secondary side switch; the flip-flop is coupled to the switch on module and an OR gate for turning on or off the secondary side switch according to an output signal of the switch on module and an output signal of the switch off module. The switch turning-off module comprises a first switch off sub-module, a second switch off sub-module, and the OR gate. The first switch off sub-module is used for turning off the secondary side switch according to an impedance of a load coupled to a power receiving module; the second switch off sub-module is used for turning off the secondary side switch according to a period of the secondary side switch; and the OR gate is coupled to the first switch off sub-module and the second switch off sub-module for turning off the secondary side switch according to an output signal of the first switch off sub-module and an output signal of the second switch off sub-module.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
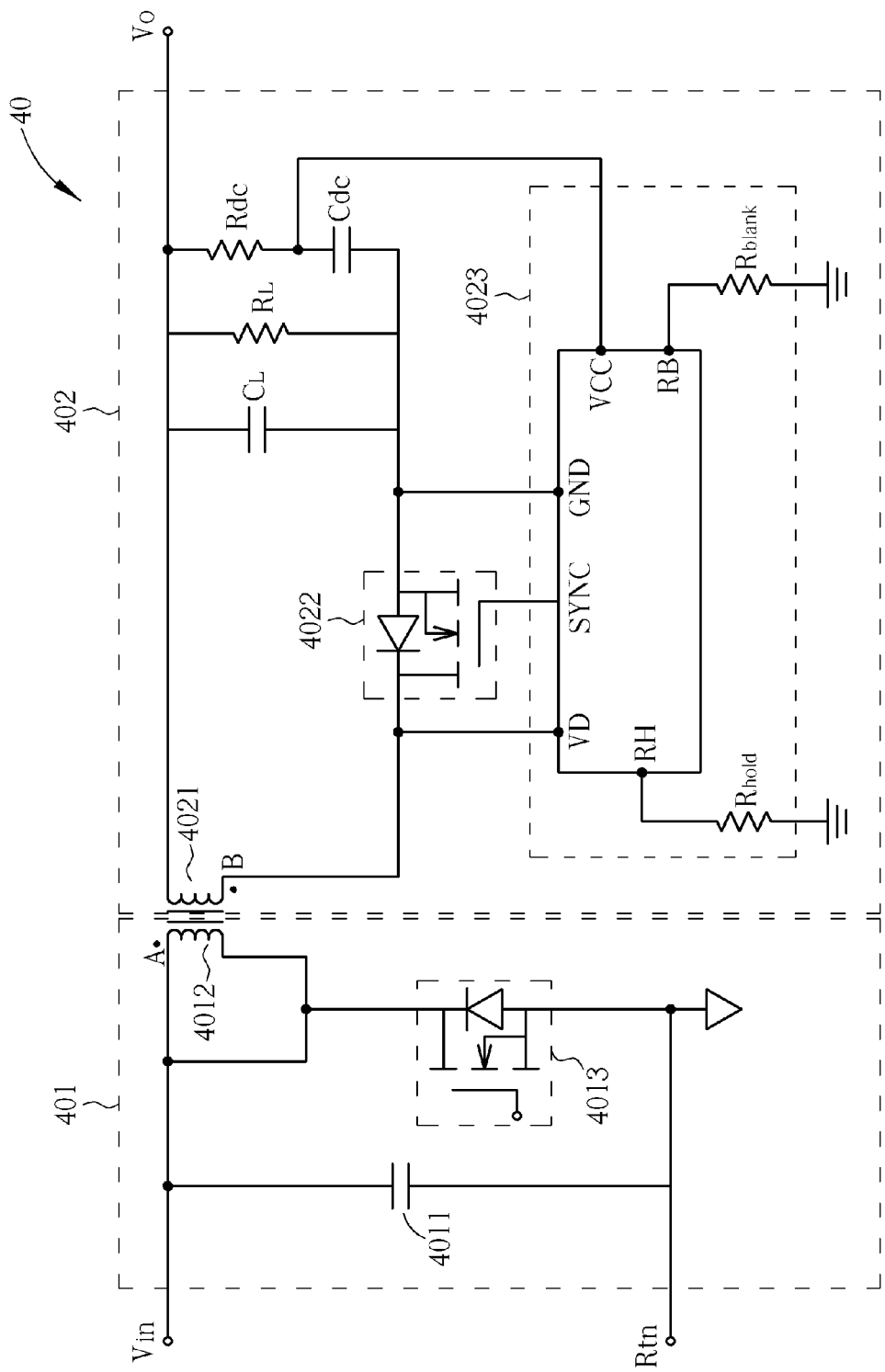
FIG. 4 is a diagram of the flyback converter system according to one embodiment of the present invention.

Please refer to FIG. 4. FIG. 4 is a diagram of a flyback converter system 40 according to one embodiment of the present invention. The flyback converter system 40 includes a power supply module 401 and a power receiving module 402. The power supply module 401 includes a voltage regulator 4011, a primary side 4012 of the flyback converter system 40, and a primary side switch 4013. The voltage regulator 4011 is used for stabilizing a voltage being inputted into the power supply module 401. The primary side 4012 of the flyback converter system 40 coupled to the voltage regulator 4011 is used for storing input power. The primary side switch 4013 is coupled between the voltage regulator 4011 and the primary side 4012 of the flyback converter system 40 for controlling a magnetic flux direction of the primary side 4012. The power receiving module 402 includes a secondary side 4021 of the flyback converter system 40, a secondary side switch 4022, a controller 4023, a load capacitor $C_L$, a load resistor $R_L$, a filtering capacitor Cdc, and a filtering resistor Rdc. The secondary side 4021 of the flyback converter system 40 coupled to the secondary side switch 4022 is used for receiving power from the primary side 4012 of the flyback converter system 40. The secondary side switch 4022 is used for turning the power receiving module 402 on or off. The controller 4023 determines whether the secondary side switch 4022 is turned on according to a drain voltage of the secondary side switch 4022. The controller 4023 is used for controlling turning off of the secondary side switch 4022 according to the drain voltage of the secondary side switch 4022, the load resistor $R_L$, and a period of the secondary side switch 4022. The controller 4023 is used for controlling enabling of the secondary side switch 4022 according to the load resistor $R_L$. In addition, the filtering capacitor Cdc and the filtering resistor Rdc are used for filtering a noise of an output voltage of the power receiving module 402. After filtering the noise, the output voltage of the power receiving module 402 is used as a supply voltage for the controller 4023.

When the primary side switch 4013 is turned on, current flows through the primary side 4012 of the flyback converter system 40 gradually, and the flyback converter system 40 stores the power in the primary side 4012. Due to a variation of the magnetic flux, the primary side 4012 and the secondary side 4021 have opposite polarities. As shown in FIG. 4, both nodes A and B are at high voltages, so there is an inverse bias imposed on a parasitic diode of the secondary side switch 4022, so that no power is transferred to the power receiving module 402. On the other hand, when the primary side switch 4013 is turned off, the magnetic flux vanishes, resulting in low voltage at the node B. Meanwhile, the parasitic diode of the secondary side switch 4022 is turned on, so power is transferred to the power receiving module 102, current flows through the load resistor $R_L$, and the load capacitor $C_L$ is charged.

Figure 5:
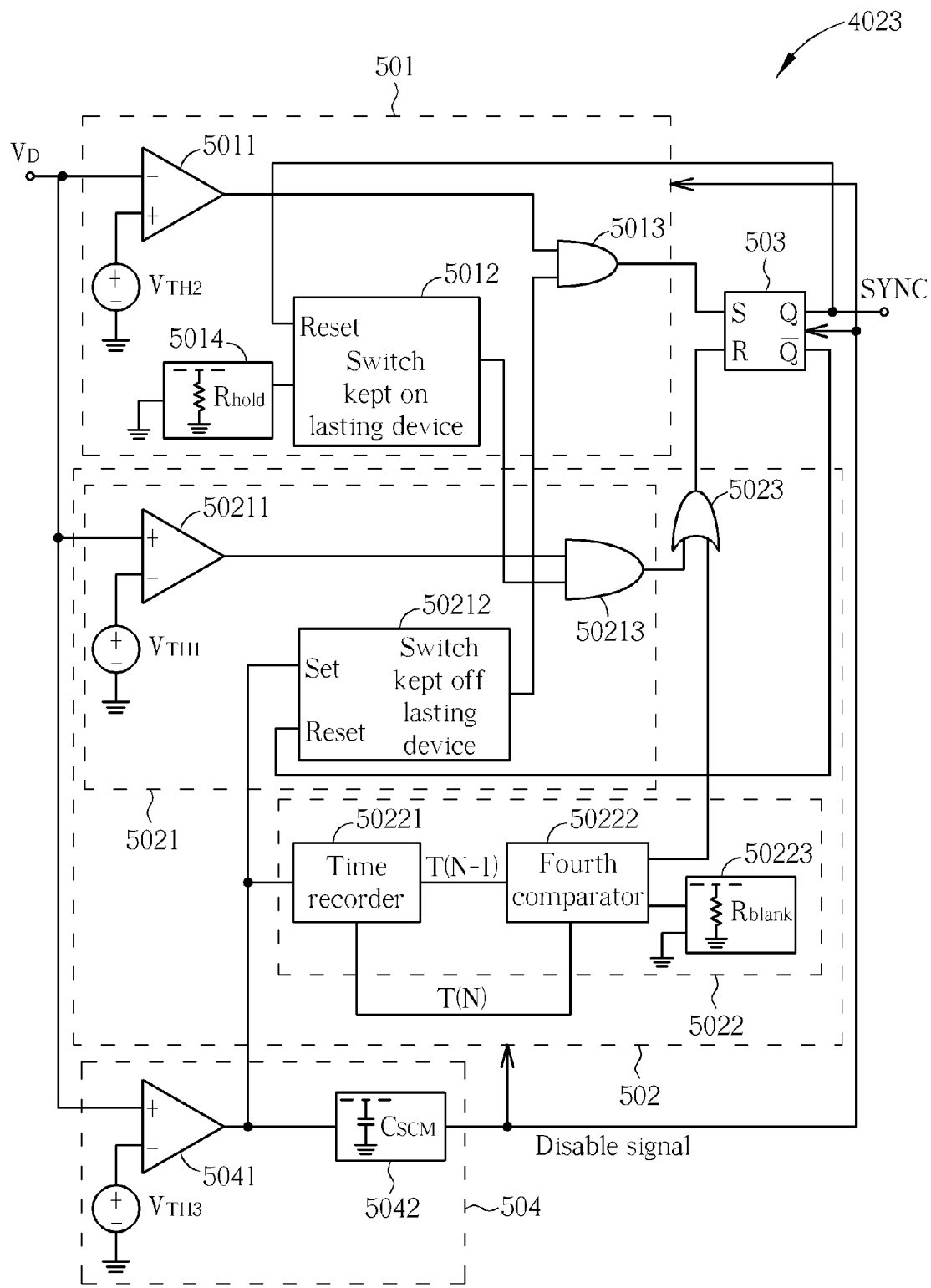
FIG. 5 is a diagram illustrating the controller of the flyback converter system in FIG. 4.

Please refer to FIG. 5 and FIG. 4. FIG. 5 is a diagram illustrating the controller 4023 of the flyback converter system 40 capable of preventing two side switches 4013, 4022 from being turned on simultaneously. The controller 4023 includes a switch on module 501, a switch off module 502, a flip-flop 503, and an enabling switch module 504. The switch on module 501 is used for turning on the secondary side switch 4022, and the switch off module 502 is used for turning off the secondary side switch 4022. The switch off module 502 includes a first switch off sub-module 5021, a second switch off sub-module 5022, and an OR gate 5023. The first switch off sub-module 5021 is used for turning off the secondary side switch 4022 according to an impedance of the load resistor $R_L$ coupled to the power receiving module 402. The second switch off sub-module 5022 is used for turning off the secondary side switch 4022 according to the period of the secondary side switch 4022. The OR gate 5023 is coupled to the first switch off sub-module 5021 and the second switch off sub-module 5022 for outputting a signal to a reset terminal of the flip-flop 503 according to an output signal of the first switch off sub-module 5021 and an output signal of the second switch off sub-module 5022. The flip-flop 503 is coupled to the switch on module 501 and the OR gate 5023. The flip-flop 503 is used to output a control signal SYNC for turning on or off the secondary side switch 4022 according to an output signal of the switch on module 501 and an output signal of the switch off module 502. The flip-flop 503 may be a set-reset (SR) flip-flop. The enabling switch module 504 is used for enabling the secondary side switch 4022 according to the impedance of the load resistor $R_L$.

The switch on module 501 includes a second comparator 5011, a switch kept on device 5012, a second AND gate 5013, and a kept on time adjustment element 5014. A positive input terminal of the second comparator 5011 is coupled to a power supply $V_{TH2}$ (a switch turning-on threshold), and a negative input terminal of the second comparator 5011 is coupled to a drain of the secondary side switch. A reset input terminal of the switch kept on device 5012 is coupled to a positive output terminal of the flip-flop 5013. A first input terminal of the second AND gate 5013 is coupled to an output terminal of the second comparator 5011, and an output terminal of the second AND gate 5013 is coupled to a signal input terminal of the flip-flop 503. A first terminal of the kept on time adjustment element 5014 is coupled to the switch kept on device 5012, and a second terminal of the kept on time adjustment element 5014 is coupled to ground.

The first switch off sub-module 5021 includes a first comparator 50211, a switch kept off device 50212, and a first AND gate 50213. A positive input terminal of the first comparator 50211 is coupled to the drain of the secondary side switch 4022, a negative input terminal of the first comparator 50211 is coupled to a power supply $V_{TH1}$ (a switch turning-off threshold). An output terminal of the switch kept off device 50212 is coupled to a second input terminal of the second AND gate 5013, and a reset input terminal of the switch kept off device 50212 is coupled to an inverse output terminal of the flip-flop 503. A first input terminal of the first AND gate 50213 is coupled to an output terminal of the first comparator 50211, a second input terminal of the first AND gate 50213 is coupled to an output terminal of the switch kept on device 5012, and an output terminal of the first AND gate 50213 is coupled to a first input terminal of the OR gate 5023.

The second switch off sub-module 5022 includes a time recorder 50221, a fourth comparator 50222, and a period threshold adjuster 50223. The time recorder 50221 is used for recording length of the period of the secondary side switch 4022 and outputting lengths of two sequential periods of the secondary side switch 4022. The fourth comparator 50222 is coupled to the time recorder 50221 and a second input terminal of the OR gate 5023. The fourth comparator 50222 is used for receiving the lengths of the two sequential periods and comparing the lengths of the two sequential periods, and used for outputting a logic signal to the second input terminal of the OR gate 5023 according to a difference between a period threshold and a difference of the lengths of the two sequential periods. The period threshold adjuster 50223 is used for adjusting the period threshold. A first terminal of the period threshold adjuster 50223 is coupled to the fourth comparator 50222 and a second terminal of the period threshold adjuster 50223 is coupled to ground.

The enabling switch module 504 includes a third comparator 5041, and a load detector 5042. A positive input terminal of the third comparator 5041 is coupled to the drain of the secondary side switch 4022, a negative input terminal of the third comparator 5041 is coupled to a power supply $V_{TH3}$, and an output terminal of the third comparator 5041 is coupled to a set input terminal of the switch kept off device 50212 and an input terminal of the time recorder 50221. An input terminal of the load detector 5042 is coupled to the output terminal of the third comparator 5041, and the load detector 5042 is used for outputting a disable signal which can disable the switch on module 501, the switch off module 502, and the flip-flop 503 when the load is very light.

Figure 1:
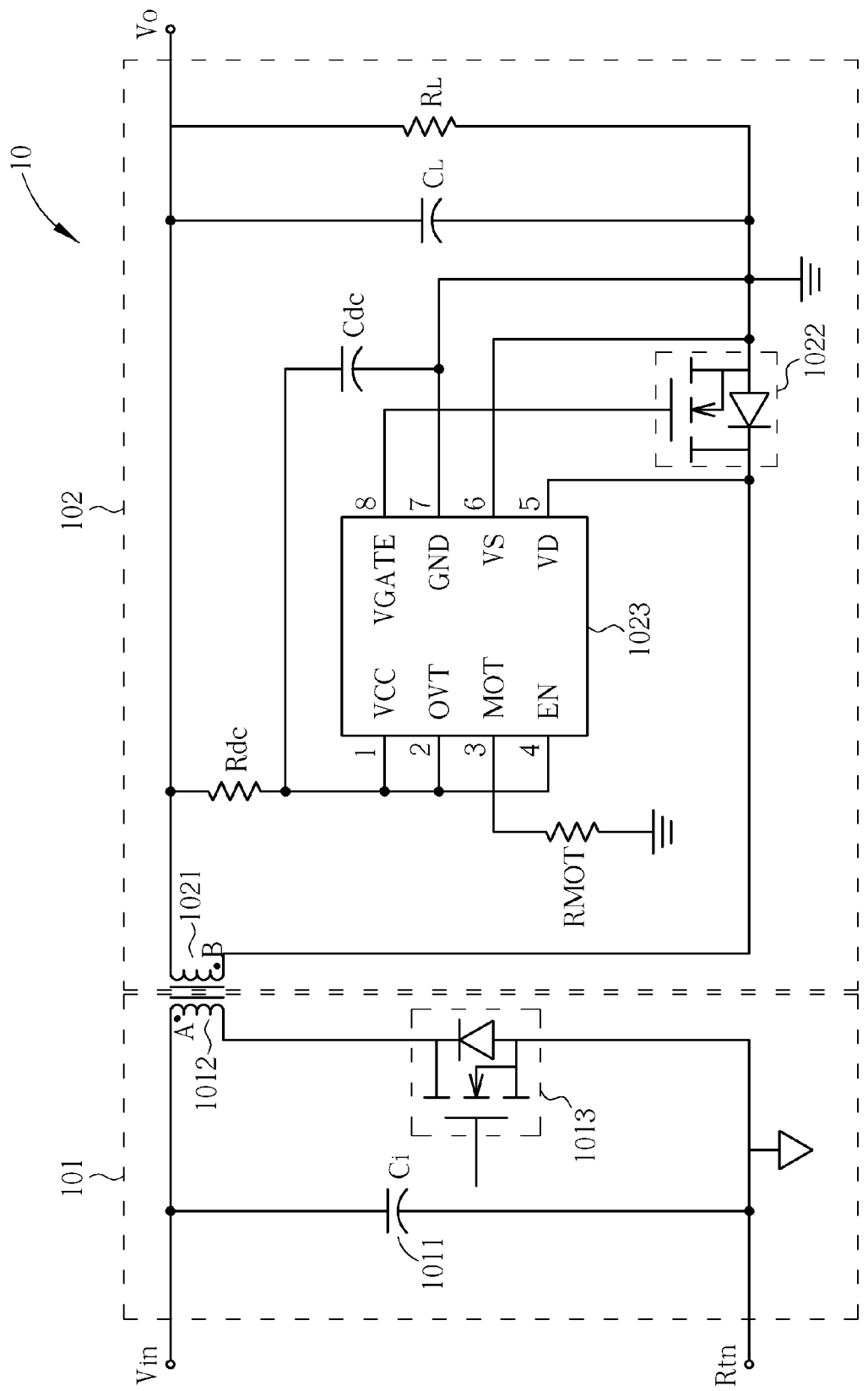
FIG. 1 is a diagram of the conventional flyback converter system.
Figure 2:
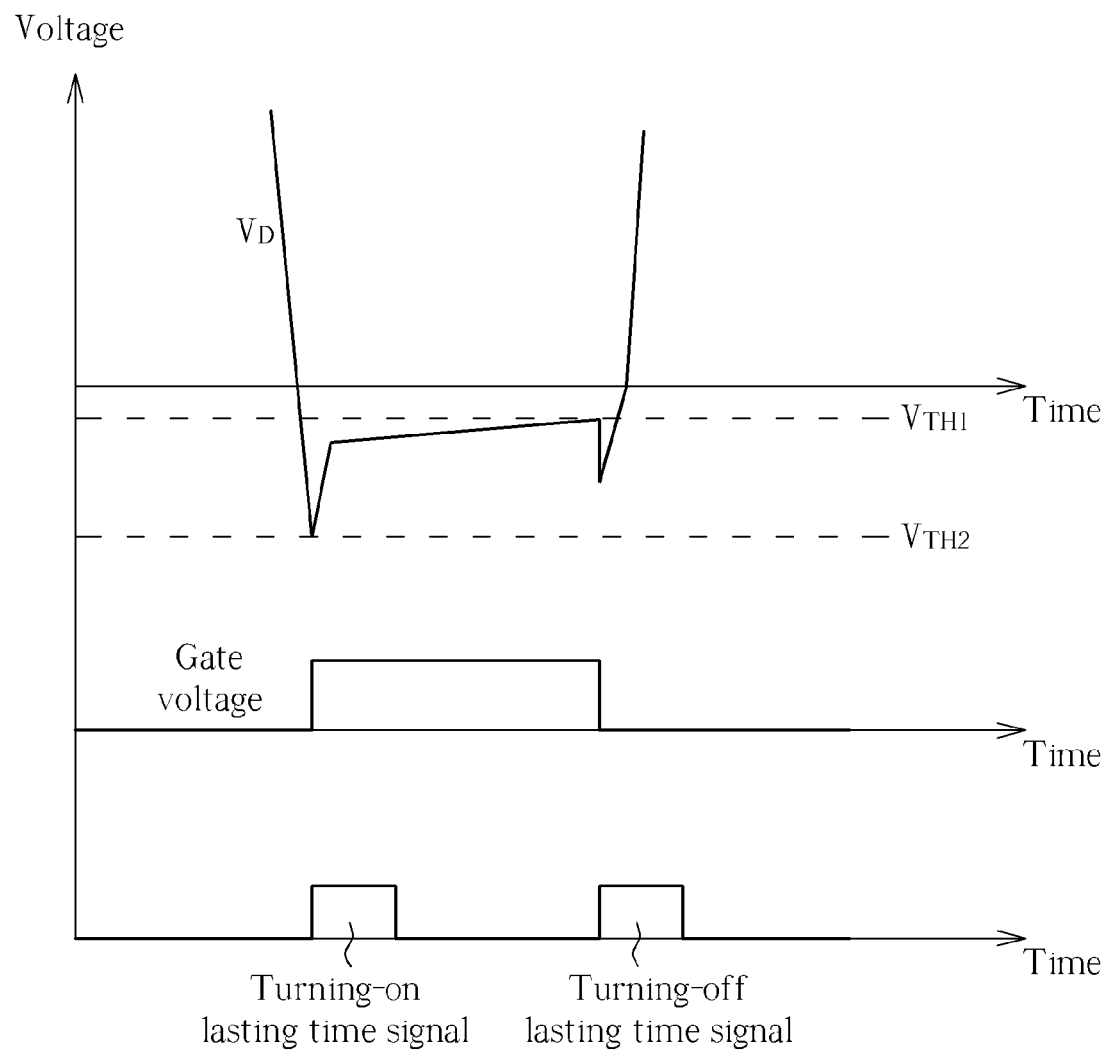
FIG. 2 is a waveform diagram of the drain voltage of the secondary side switch, the gate voltage of the secondary side switch, the turning-on lasting time, and the turning-off lasting time when the power receiving module with the light load (discontinuous current mode, DCM).
Figure 3:
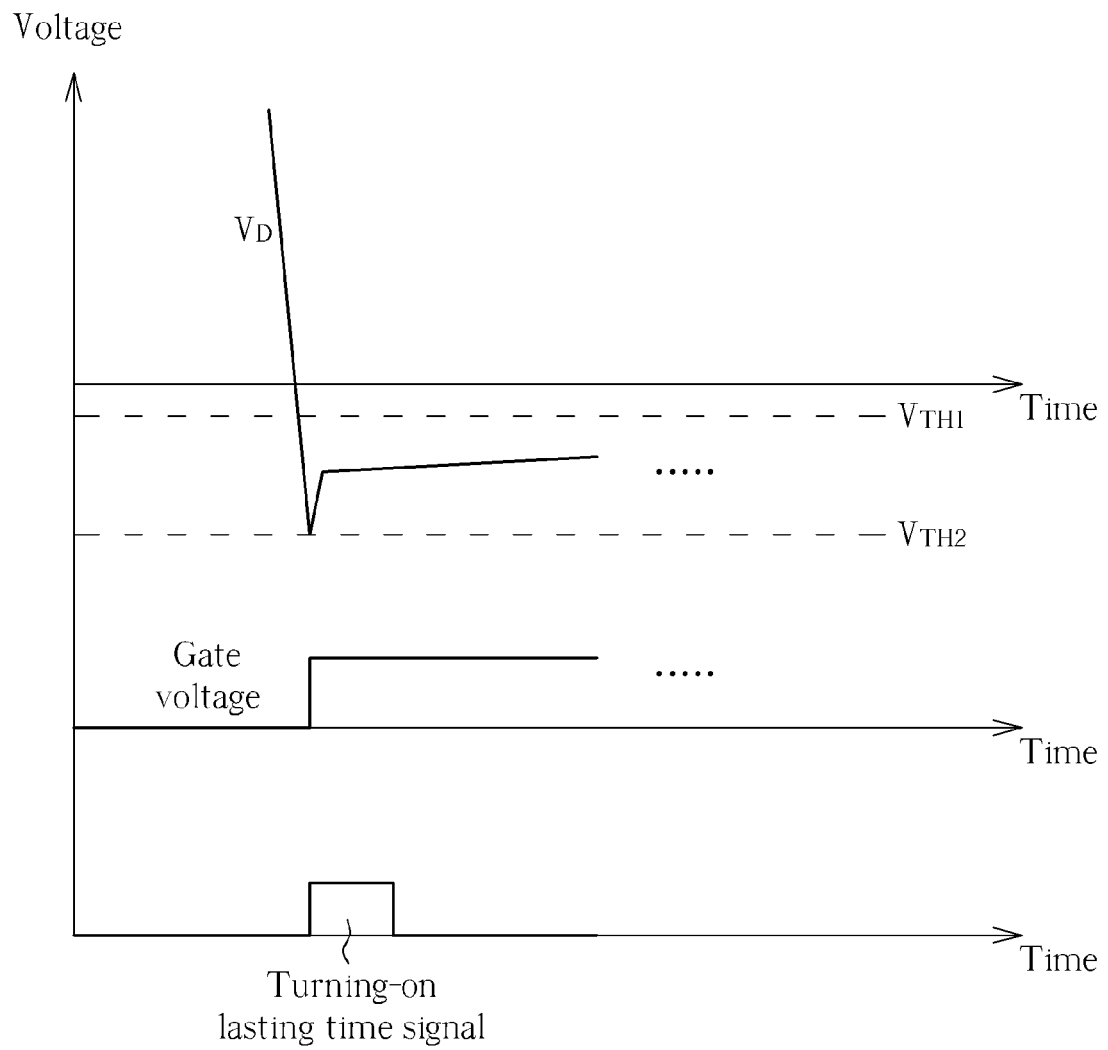
FIG. 3 is a waveform diagram of the drain voltage of the secondary side switch, the gate voltage of the secondary side switch, the turned-on lasting time, and the turned-off lasting time when the power receiving module with the heavy load (continuous current mode, CCM).

Please refer to FIG. 2 and FIG. 4. In DCM mode, when the primary side switch 4013 is turned off, the magnetic flux vanishes resulting in voltage at the node B being lower than a switch turning-on threshold $V_{TH2}$, and the secondary side switch 4022 is turned on. Because of the light load, current flowing through the secondary side switch 4022 is low. When the magnetic flux direction changes again, the current through secondary side switch 4022 is reduced to zero. If the node B is at a voltage higher than a switch turning-off threshold $V_{TH1}$, the secondary side switch 4022 is turned off. Because the current through the secondary side switch 4022 is low and a drain voltage of the secondary side switch 4022 is not very low, when the primary side switch 4013 is turned on again, voltage at the node B easily rises over the switch turning-off threshold $V_{TH1}$, so as to prevent the primary side switch 4013 and the secondary side switch 4022 from being turned on simultaneously, and prevent the flyback converter system 40 from being damaged.

As mentioned above, the primary side switch 4013 and the secondary side switch 4022 are not turned on simultaneously in DCM mode, therefore the operation of the controller 4023 is not described again. Please refer to FIG. 5. In CCM mode, when the primary side switch 4013 is turned off, the magnetic flux vanishes, resulting in voltage at the node B of the power receiving module 402 being lower than the switch turning-on threshold VTH2 (that is, $V_D$ is a low voltage). Meanwhile, the second comparator 5011 outputs a logic-high voltage signal to the second AND gate 5013, and the switch kept off device 50212 also outputs a logic-high voltage signal to the second AND gate 5013. So, the second AND gate 5013 outputs a logic-high voltage signal to the signal input terminal of the flip-flop 503. Due to $V_D$ being a low voltage, the first comparator 50211 outputs a logic-low voltage signal to the first AND gate 50213, and the switch kept on device 5012 also outputs a logic-low voltage signal to the first AND gate 50213 for a period of time to ensure the first AND gate 50213 outputs a logic-low voltage signal. That is to say, the first switch off sub-module 5021 may not interfere with the secondary side switch 4022 being turned on. Due to $V_D$ being a low voltage, the third comparator 5041 outputs a logic-low voltage signal, and both the enabling switch module 504 and the second switch off sub-module 5022 are inactive.

Figure 6:
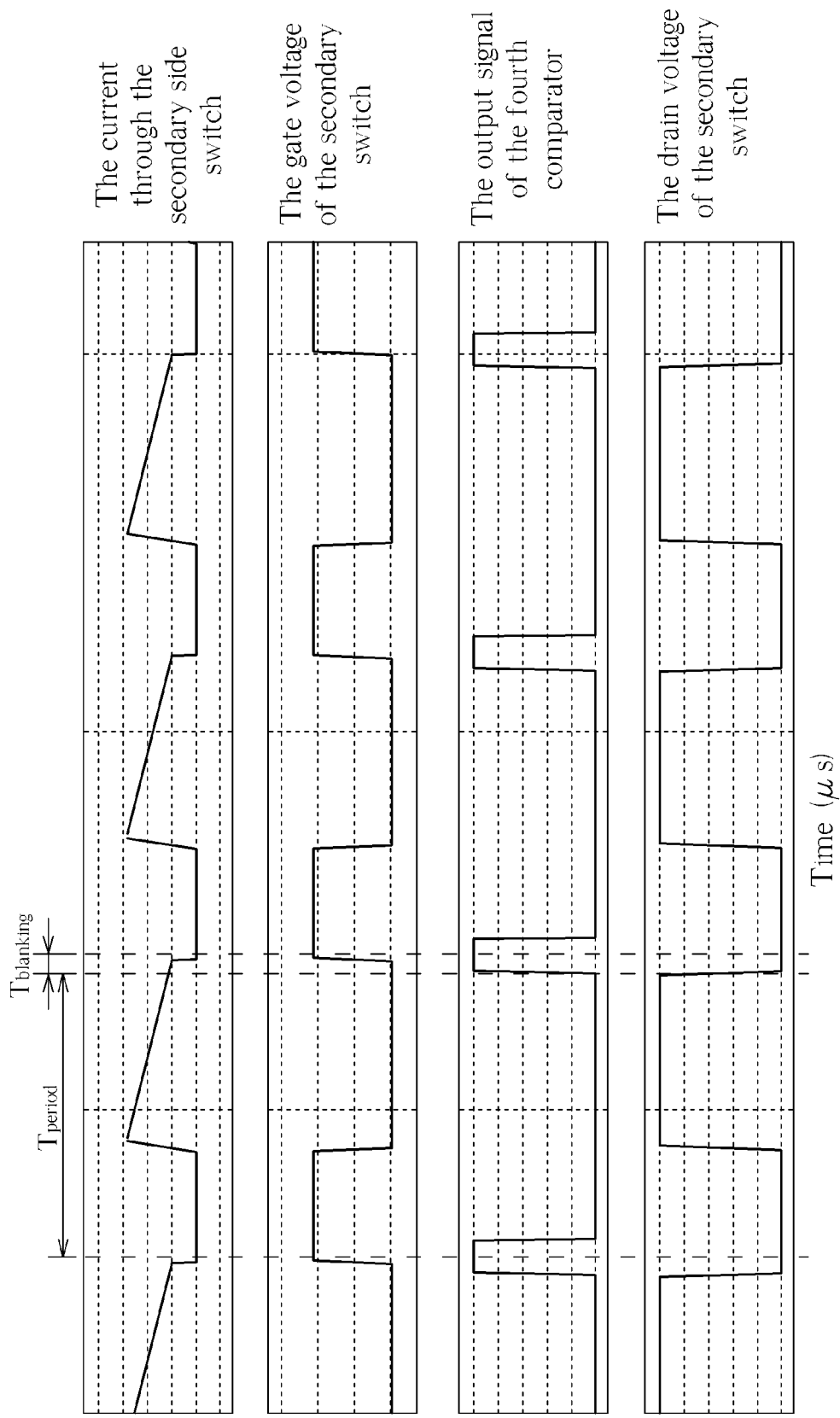
FIG. 6 is a waveform diagram of the current of the secondary side switch, the gate voltage of the secondary side switch, the drain voltage of the secondary side switch, and the output signal of the fourth comparator in CCM mode.

Please refer to FIG. 5. In CCM mode, when the primary side switch 4013 is turned on again, the magnetic flux changes, resulting in the node B of the power receiving module 402 being at a high voltage (that is, $V_D$ is a high voltage). Therefore, the switch on module 501 outputs a logic-low voltage signal to the signal input terminal of the flip-flop 503 (and the switch kept on device 5012 also outputs a logic-low voltage signal to the second AND gate 5013 to ensure the signal input terminal of the flip-flop 503 receives the logic-low voltage signal). Due to $V_D$ being a high voltage, the first comparator 50211 should output a logic-high voltage signal to the first AND gate 50213. However, in CCM mode, a current through the secondary side switch 4022 is larger than a current in DCM mode, so voltage at $V_D$ is not higher than $V_{TH1}$ (a switch turning-off threshold), which would cause the secondary side switch 4022 to be unable to be turned off via the first switch off sub-module 5021. Due to $V_D$ being a high voltage, when voltage at $V_D$ is higher than $V_{TH3}$, the third comparator 5041 outputs a logic-high voltage signal to the set terminal of the switch kept off device 50212 and the time recorder 50221. Then, the switch kept off device 50212 outputs a logic-low voltage signal to the second AND gate 5013, and the time recorder 50221 records a length of a time interval until voltage at $V_D$ is higher than $V_{TH3}$ again. The length of the time interval is defined as a period $T_{period}$ of the secondary side switch 4022. Then the fourth comparator 50222 compares lengths of two sequential periods of the secondary side switch 4022. When a difference between the lengths of the two sequential periods is less than the period threshold $T_{blanking}$, the fourth comparator 50222 outputs a logic-high voltage signal to the OR gate 5023, and the OR gate 5023 outputs a logic-high voltage signal to the reset input terminal of the flip-flop 503, which would cause a logic-low voltage at SYNC, resulting in the secondary side switch 4022 being turned off (please refer to FIG. 6). The first switch off sub-module 5021 and the second switch off sub-module 5022 prevent the primary side switch 4013 and the secondary side switch 4022 from being turned on simultaneously.

Please refer to FIG. 5. A turning-on lasting time adjusting resistor $R_{hold}$ of the kept on time adjustment element 5014 is used for adjusting the turning-on lasting time. A period threshold adjusting resistor $R_{blank}$ of the period threshold adjuster 50223 is used for adjusting the period threshold.

Figure 7:
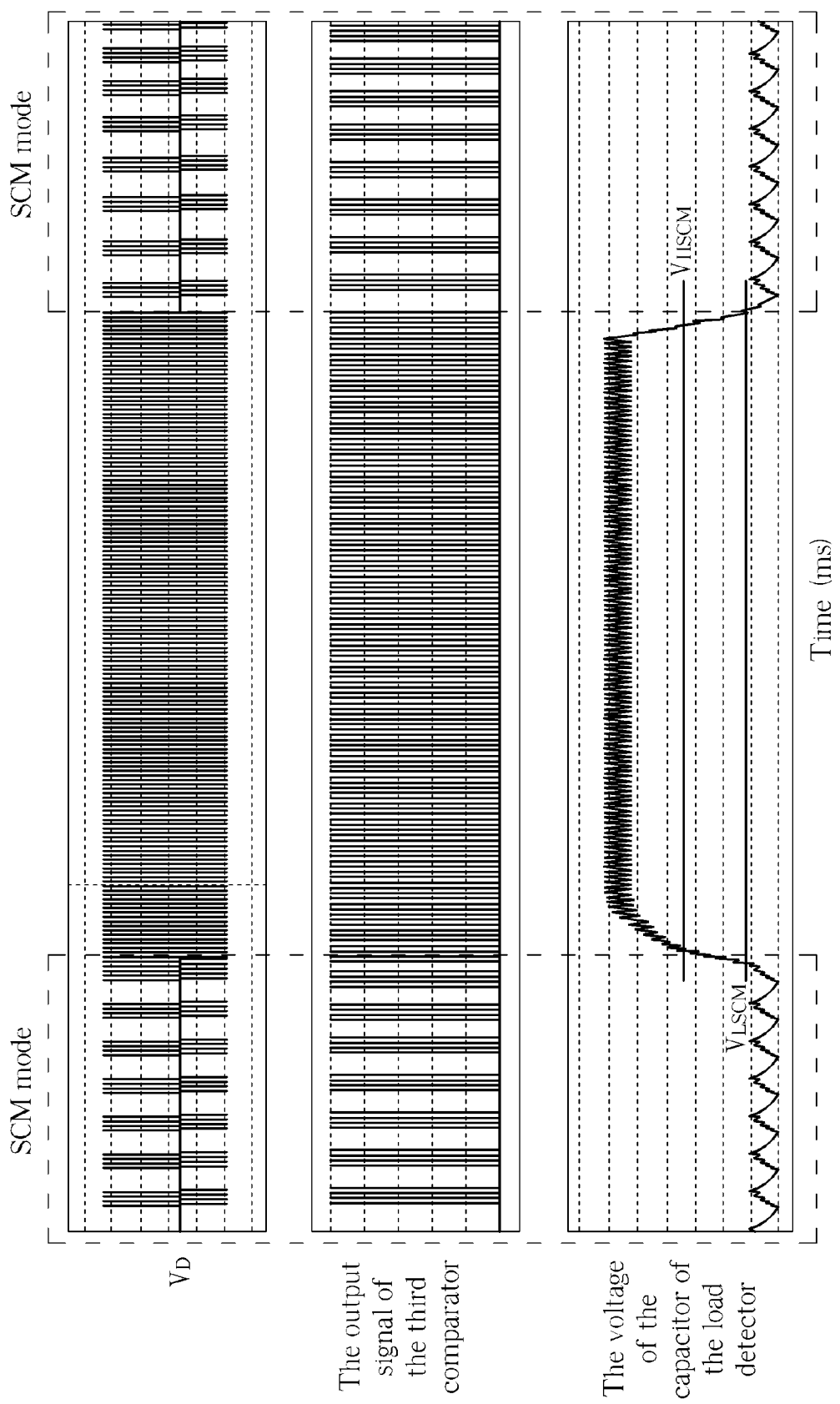
FIG. 7 is a waveform diagram of the drain voltage of the secondary side switch, the output signal of the third comparator, and the voltage of the capacitor of the load detector in SCM mode.

In addition to DCM mode and CCM mode, the flyback converter system 40 may have a very light load (skip cycle mode, SCM). When the power receiving module 402 has the very light load, the primary side switch 4013 may not be turned on in every period. Therefore, the enabling switch module 504 including the load detector 5042 is provided. When the flyback converter system 40 is in SCM mode, the load detector 5042 may disable the switch on module 501, the switch off module 502, and the flip-flop 503. When the flyback converter system 40 leaves SCM mode, the load detector 5042 may enable the switch on module 501, the switch off module 502, and the flip-flop 503 again. Please refer to FIG. 5 and FIG. 7. After the primary side switch 4013 is turned on, voltage at $V_D$ is higher than $V_{TH3}$ while the third comparator 5041 outputs the logic-high voltage signal. After the primary side switch 4013 is turned off, voltage at $V_D$ is lower than $V_{TH3}$ while the third comparator 5041 outputs the logic-low voltage signal. When the third comparator 5041 outputs the logic-high voltage signal, a capacitor $C_{SCM}$ of the load detector 5042 is charged. When the third comparator 5041 outputs the logic-low voltage signal, the capacitor $C_{SCM}$ of the load detector 5042 is discharged. In SCM mode, the primary side switch 4013 may not be turned on in every period, so voltage of the capacitor $C_{SCM}$ is very low; when leaving SCM mode, the voltage of the capacitor CSCM raises persistently. Determination of whether the flyback converter system 40 is in SCM mode or not may be performed according to the voltage of the capacitor $C_{SCM}$ through a hysteresis effect. When the voltage of the capacitor $C_{SCM}$ is higher than $V_{HSCM}$, the flyback converter system 40 leaves SCM mode; when the voltage of the capacitor $C_{SCM}$ is lower than $V_{LSCM}$, the flyback converter system 40 is in SCM mode. $V_{HSCM}$ and $V_{LSCM}$ may be determined by experiment.

In summary, compared to conventional design, in which $V_{TH1}$ is adjusted according to a load, in the embodiments above, $V_{TH1}$ may be set to a negative value approaching zero. Therefore, even if the flyback converter system 40 is in CCM mode, and the current through the secondary side switch 4022 becomes large, resulting in the secondary side switch 4022 being not turned off, the period of the secondary side switch 4022 may still be detected via the second switch off sub-module 5022, so as to force the secondary side switch 4022 to be turned off before the primary side switch 4013 is turned on, and to ensure normal operation of the flyback converter system 40. In addition, the embodiments further provide the enabling switch module 504. When the load is very light, the enabling switch module 504 may disable the switch on module 501, the switch off module 502, and the flip-flop 503 for economizing power.

Those skilled in the art will readily observe that numerous modifications and alterations of the device and method may be made while retaining the teachings of the invention.

What is claimed is:

1. A flyback converter system capable of preventing two side switches from being turned on simultaneously, the flyback converter system comprising:
    a power supply module comprising:
        a voltage regulator for maintaining a voltage inputted to the power supply module;
        a primary side of the flyback converter system coupled to the voltage regulator; and
        a primary side switch coupled between the voltage regulator and the primary side of the flyback converter system for controlling a magnetic flux direction of the primary side of the flyback converter system; and
    a power receiving module comprising:
        a secondary side of the flyback converter system for receiving power from the primary side of the flyback converter system;
        a secondary side switch coupled to the secondary side of the flyback converter system; and
        a controller comprising:
            a switch on module for turning on the secondary side switch;
            a switch off module for turning off the secondary side switch, the switch off module comprising:
                a first switch off sub-module for turning off the secondary side switch according to an impedance of a load coupled to the power receiving module;

a second switch off sub-module for turning off the secondary side switch according to a period of the secondary side switch; and an OR gate coupled to the first switch off sub-module and the second switch off sub-module for turning off the secondary side switch according to an output signal of the first switch off sub-module and an output signal of the second switch off sub-module; and a flip-flop coupled to the switch on module and the OR gate for controlling on and off states of the secondary side switch according to an output signal of the switch on module and an output signal of the switch off module.

2. The flyback converter system of claim 1, wherein the controller further comprises an enabling switch module for controlling if the secondary side switch is to be enabled according to the impedance of the load.

3. The flyback converter system of claim 2, wherein the enabling switch module comprises:
a third comparator having a positive input terminal coupled to the drain of the secondary side switch, and a negative input terminal coupled to a third power supply; and
a load detector having an input terminal coupled to an output terminal of the third comparator, the load detector being used for outputting a disable signal for disabling the switch on module, the switch off module, and the flip-flop when the load is very light.

4. The flyback converter system of claim 3, wherein the load detector comprises a capacitor.

5. The flyback converter system of claim 1, wherein the switch on module comprises:
a second comparator having a negative input terminal coupled to a drain of the secondary side switch, and a positive input terminal coupled to a second power supply;
a switch kept on device having a reset input terminal coupled to a positive output terminal of the flip-flop;
a second AND gate having a first input terminal coupled to an output terminal of the second comparator, and an output terminal coupled to a signal input terminal of the flip-flop; and
a kept on time adjustment element having a first terminal coupled to the switch kept on device, and a second terminal coupled to ground.

6. The flyback converter system of claim 5, wherein the kept on time adjustment element comprises a resistor.

7. The flyback converter system of claim 5, wherein the first switch off sub-module comprises:
a first comparator having a positive input terminal coupled to the drain of the secondary side switch, and a negative input terminal coupled to a first power supply;
a switch kept off device having an output terminal coupled to a second input terminal of the second AND gate, and a reset input terminal coupled to an inverse output terminal of the flip-flop; and
a first AND gate having a first input terminal coupled to an output terminal of the first comparator, a second input terminal coupled to an output terminal of the switch kept on device, and an output terminal coupled to a first input terminal of the OR gate.

8. The flyback converter system of claim 7, wherein the second switch off sub-module comprises:
a time recorder for recording length of a period of the secondary side switch and outputting lengths of two sequential periods of the secondary side switch;

a fourth comparator coupled to the time recorder and a second input terminal of the OR gate for receiving the lengths of the two sequential periods of the secondary side switch, comparing the lengths of the two sequential periods of the secondary side switch, and outputting a logic signal to the second input terminal of the OR gate according to a difference between a period threshold and a difference of the lengths of the two sequential periods; and a period threshold adjuster having a first terminal coupled to the fourth comparator, and a second terminal coupled to ground, the period threshold adjuster being used for adjusting the period threshold.

9. The flyback converter system of claim 8, wherein the period threshold adjuster comprises a resistor.

10. The flyback converter system of claim 8, wherein the controller further comprises an enabling switch module for enabling the secondary side switch according to the impedance of the load.

11. The flyback converter system of claim 10, wherein the enabling switch module comprises:
a third comparator having a positive input terminal coupled to the drain of the secondary side switch, a negative input terminal coupled to a third power supply, and an output terminal coupled to a set input terminal of the switch kept off device and an input terminal of the time recorder; and
a load detector having an input terminal coupled to the output terminal of the third comparator for outputting a disable signal for disabling the switch on module, the switch off module, and the flip-flop when the load is very light.

12. The flyback converter system of claim 11, wherein the load detector comprises a capacitor.

13. The flyback converter system of claim 1, wherein an output terminal of the OR gate is coupled to a reset input terminal of the flip-flop.

14. The flyback converter system of claim 1, wherein the secondary side switch is an N-type Metal-Oxide-Semiconductor (NMOS) transistor.

15. The flyback converter system of claim 1, wherein the flip-flop is a set-reset (SR) flip-flop.

16. The flyback converter system of claim 1, wherein the voltage regulator comprises a capacitor.

17. The flyback converter system of claim 1, wherein the primary side switch is an N-type Metal-Oxide-Semiconductor (NMOS) transistor.

18. The flyback converter system of claim 1, wherein the power receiving module further comprises a filter coupled to the controller, the secondary side switch, and the secondary side of the flyback converter system for filtering an output noise of the power receiving module.

19. A controller capable of preventing two side switches of a flyback converter system from being turned on simultaneously, the controller comprising:
a switch on module for turning on a secondary side switch of the flyback converter system;
a switch off module for turning off the secondary side switch, the switch off module comprising:
a first switch off sub-module for turning off the secondary side switch according to an impedance of a load coupled to a power receiving module;
a second switch off sub-module for turning off the secondary side switch according to a period of the secondary side switch; and
an OR gate coupled to the first switch off sub-module and the second switch off sub-module for turning off the secondary side switch according to an output signal of the first switch off sub-module and an output signal of the second switch off sub-module; and a flip-flop coupled to the switch on module and the OR gate for turning on or off the secondary side switch according to an output signal of the switch on module and an output signal of the switch off module.

20. The controller of claim 19 further comprising:

an enabling switch module for enabling the secondary side switch according to the impedance of the load.

21. The controller of claim 20, wherein the enabling switch module comprises:
   a third comparator having a negative input terminal coupled to a third power supply; and
   a load detector having an input terminal coupled to an output terminal of the third comparator, the load detector being used for outputting a disable signal for disabling the switch on module, the switch off module, and the flip-flop when the load is very light.

22. The controller of claim 21, wherein the load detector comprises a capacitor.

23. The controller of claim 19, wherein the switch on module comprises:
   a second comparator having a positive input terminal coupled to a second power supply;
   a switch kept on device having a reset input terminal coupled to a positive output terminal of the flip-flop;
   a second AND gate having a first input terminal coupled to an output terminal of the second comparator, and an output terminal coupled to a signal input terminal of the flip-flop; and
   a kept on time adjustment element having a first terminal coupled to the switch kept on device, and a second terminal coupled to ground.

24. The controller of claim 23, wherein the kept on time adjustment element comprises a resistor.

25. The controller of claim 23, wherein the first switch off sub-module comprises:
   a first comparator having a negative input terminal coupled to a first power supply;
   a switch kept off device having an output terminal coupled to a second input terminal of the second AND gate, and a reset input terminal coupled to an inverse output terminal of the flip-flop; and
   a first AND gate having a first input terminal coupled to an output terminal of the first comparator, a second input terminal coupled to an output terminal of the switch kept on device, and an output terminal coupled to a first input terminal of the OR gate.

26. The controller of claim 25, wherein the second switch off sub-module comprises:
   a time recorder for recording length of a period of the secondary side switch and outputting lengths of two sequential periods of the secondary side switch;
   a fourth comparator coupled to the time recorder and a second input terminal of the OR gate for receiving the lengths of the two sequential periods of the secondary side switch and comparing the lengths of the two sequential periods of the secondary side switch, and for outputting a logic signal to the second input terminal of the OR gate according to a difference between a period threshold and a difference of the lengths of the two sequential periods; and
   a period threshold adjuster having a first terminal coupled to the fourth comparator, and a second terminal coupled to ground, the period threshold adjuster being used for adjusting the period threshold.

27. The controller of claim 26, wherein the period threshold adjuster comprises a resistor.

28. The controller of claim 26 further comprising:
   an enabling switch module for enabling the secondary side switch according to the impedance of the load.

29. The controller of claim 28, wherein the enabling switch module comprises:
   a third comparator having a negative input terminal coupled to a third power supply, and an output terminal coupled to a set input terminal of the switch kept off device and an input terminal of the time recorder; and
   a load detector having an input terminal coupled to the output terminal of the third comparator, the load detector being used for outputting a disable signal for disabling the switch on module, the switch off module, and the flip-flop when the load is very light.

30. The controller of claim 29, wherein the load detector comprises a capacitor.

31. The controller of claim 19, wherein an output terminal of the OR gate is coupled to a reset input terminal of the flip-flop.

32. The controller of claim 19, wherein the flip-flop is a set-reset (SR) flip-flop.

* * * * *